2,856,750
Patented Oct. 21, 1958

2,856,750
VINYL RESIN IMPREGNATED RAYON CORDAGE

Ellis Lewis, Jenkintown, Pa., assignor to American Viscose Corporation, Philadelphia, Pa., a corporation of Delaware No Drawing. Application June 2, 1955
Serial No. 512,855

10 Claims. (Cl. 57—153)

This invention relates to cordage and more particularly to rayon baling twine.

Heretofore, twine spun from natural sisal fibers has been the primary cordage employed in automatic baling machines, such as the agricultural equipment used to bale hay or straw. Resilience, relatively high strength, low cost, as well as other advantages have contributed to almost universal acceptance of sisal baling twine. Inherent in its use, however, are certain deficiencies including lack of uniformity in knot strength which causes a high percentage of broken bales. This disadvantage is somewhat overcome by increasing the weight and hence the bulk of the twine per unit strength, but such practice has obvious drawbacks and limitations. In addition to lack of uniformity, sisal is an imported fiber, the price of which is also subject to wide fluctuations.

Rayon, on the other hand, being a synthetic fiber can be manufactured with quite uniform physical characteristics such as tenacity and elongation at breaking strength but is devoid of certain properties, e. g., stiffness, water repellency and low knot slippage that are essential in a satisfactory twine for baling hay, e. g., alfalfa, soya beans, clover, etc., and straw with conventional equipment.

In early attempts to use a rayon strand as a baling twine, it was demonstrated that the strand had flexibility, exceptional uniformity, and much greater strength per unit denier than sisal, but a rayon twine having adequate strength for baling was substantially smaller in cross section than the sisal twine in current use, and much too limber to function properly in the knotter of a baler. Furthermore, a rayon strand which had not been pretreated for use as a baler twine was found to have undesirable elongation and tended to fray badly as it was pulled through between the bales. Fraying, of course, reduces the strength of the strand and weakens the knots.

An object of the present invention, therefore, is the manufacture of rayon baling twine which has good moisture resistance and/or wet strength, is low in cost, and has those properties which allow it to be satisfactorily used in automatic balers. Objects ancillary to the foregoing object in adapting a rayon strand suitable for use as a baling twine are to render it abrasion resistant, moisture resistant, non-injurious to workers' hands, and to provide it with high knot strength. Other objects and advantages are apparent from the following description and examples.

It has been discovered that regenerated cellulose filamentary material of the order 25,000 to 40,000 denier and twisted to about 1 turn per inch may be coated and/or impregnated with certain organic polymeric resins that may be used in conventional hay or straw baling machines in place of the substantially bulkier sisal twine in general use. Best rayon twines are obtained by carrying out the coating of the untreated rayon strand with solutions of the resins, rather than with aqueous dispersions, at such concentrations and under conditions whereby the amount of the resin acquired by the rayon filaments is about 3 to 20 percent of the dry weight of the dry untreated strand.

The solutions supplied in accordance with this invention comprise preferably organic solvents and a dissolved vinyl resin. This latter term is applied to those polymers and copolymers formed from monomers which contain a vinyl or vinylidene radical, such as vinyl chloride, vinyl acetate, vinylidene chloride, acrylonitrile, maleic anhydride, styrene, methyl vinyl ether, and others. Some of the vinyl resins appear to impart higher knot strength to the rayon twine although all improve the knot strength when applied by a solution in which the concentration of the resin has been adjusted to provide such bonding of the rayon filaments as to obtain optimum knot strength corresponding to a particular resin.

In addition to knot strength, a desirable attribute of a baler twine is that it be free from slipping within the knot so that the tie or bond does not elongate to produce loosely bound bales, or the tie does not become untied. Slipping of the twine through the knot appears to be related to the pliability of the twine and the frictional surface characteristics rendered thereto by the material applied to the rayon twine as a coating, impregnant, or finish. For example, applying the resin as a solution of too high concentration results in a twine which carreis an excessive amount of the resin and is thus inclined to be too stiff. If the twine is too stiff, it does not form tight knots and the twine tends to slip within the knots. Furthermore, some resins are more slippery than others and must therefore be applied to the yarn more sparingly than other resins. In some instances, it was found that the knot strength decreased with increases in the amount of the resin contained by the twine. On the other hand, if the resin content of the rayon twine is too scant, optimum knot strength is not realized. Since plasticizers mixed with the resin tend to make the twine more slippery, satisfactory twine finishes are obtained with little or none of the conventional plasticizers mixed with the resins used in this invention. Resins which are typical of those which function as rayon twine finishes to provide good knot strength and to prevent slipping are polystyrene in a broad range of molecular weights, and copolymers of vinyl chloride and vinyl acetate containing a predominant portion of the vinyl chloride.

Although aqueous dispersions of the resins may be used to impregnate the untreated rayon twine to increase its knot strength, the presence of dried-in dispersing or surface-active agents in the twine reduces the moisture resistance of the twine. Thus, as the twine is normally used while exposed to the weather, it is desirable to provide the twine with maximum moisture resistance, particularly as the wet strength of rayon is lower than its dry strength. Consequently the finishes of this invention are applied preferably as solutions which are absorbed to such an extent by the rayon filaments as to increase the weight or denier of the twine (dry untreated basis) in the range of about 3 to 20 percent for most of the vinyl resins. Most economical use of the resin consistent with high knot strength and non-slipperiness appears to result from twines which comprise from about 4 to 11 percent of the resin based on the weight of the untreated twine.

In general, volatile organic solvents, and particularly those which produce little swelling of the regenerated cellulose filaments, are used for obtaining twine finish solutions of the invention. Aqueous solutions are not desired because of the relatively low volativity of water and the magnitude of swelling of the filament that occurs before vaporization of the water can be effected. For example, suitable solvents for the vinyl chloride-vinyl acetate copolymer include low boiling ketones, chlorinated hydrocarbons, dioxane, and tetrahydrofurane. Solvents for polystyrene which do not appreciably affect the rayon include chlorinated hydrocarbons, tetrahydrofurane, and alkyl aromatic hydrocarbons. While polyvinyl alcohol is soluble in water, because of its tendency to swell cellulose, a more suitable solvent for use in practicing this invention is one of the low-boiling temperature alcohols. Satisfactory solutions of polyvinyl butyrol may be prepared in the lower alcohols, ethers, and dioxane. Vinylchloride vinylidene-chloride copolymers are soluble in such ketones as methyl ethyl ketone, cyclohexanone, and methyl isobutyl ketone which do not adversely affect the filaments of the twine. Polyvinylidene chloride likewise may be applied in solutions in cyclic ethers and ketones.

The amount of resin contained by the dry resin-treated twine is controlled primarily by such conditions as the concentration of the resin in the solution applied to the untreated twine, the temperature of the solution, and the rate of dipping the twine in the solution. In conformity with the most effective and economical use of the resin the solutions are adjusted to such viscosity and concentration as to deposit in the twine an amount of resin which may vary between about 3 to 20 percent but which preferably lies in the range of 4 to 11 percent of the dry weight of the untreated twine. To bring about this result, satisfactory dipping solutions were prepared as illustrated by the examples. In applying twine finishes as described in the examples below, it was found that the percentage increase in weight of the twine by disposition of the resin was roughly one and one-half times that of the concentration by percentage of the resin in the solution.

To utilize more fully the potential benefits obtainable from resin-treated rayon twine, the twine must be constructed with regard to the proper direction of twist and the amount of twist. Because of the manner in which a conventional knotter is constructed and operates, it is preferable to have the twine formed with a Z-twist. Strangely, it was found that a 25,000 to 40,000 denier twine had best knot strengths when twisted within the range of 0.8 to 1.5 turns per inch, the preferable twist rate for deniers of 30,000 to 35,000 being about 1 turn per inch. This amount of twist in a 25,000 to 40,000 denier strand defines in general the preferred angularity of the filaments with respect to the lineal axis of the twine and the density of the filaments in the twine. With this concept in mind, twines of greater or lesser denier may be twisted accordingly to provide similar density and angularity of the filaments. Furthermore, it was found that superior knot strengths were obtained if the twine was twisted before application of the resinous solution and the subsequent drying thereof. Apparently the filaments are organized by this procedure into a stronger more compact structure than when dipped in the untwisted condition and thereafter dried and twisted.

In further respect to the direction of twist, it is to be noted that the direction in which twine is manipulated by the knotting mechanism determines the direction of twist because it is found that the knots are stronger for a given direction of twist if tied "left-handed" or "right-handed" as the case may be. In a conventional knotter in extensive use, the twine is tied in a "left-hand" which means that if two pieces of twine are held together with the ends pointing upward, the upper extremities of the pieces are wrapped around lower portions of both pieces in a counter-clockwise direction to form a common loop or "chicken-head" knot. For Z-twisted twine, the knots should be "left-handed"; S-twisted twine is tied in a "right-hand" knot.

The following examples will serve to illustrate and further explain the invention.

Example 1

Twenty-one ends of untwisted tire yarn, each yarn comprising 980 filaments and measuring approximately 1680 denier, were plied at 1.1 turns per inch of Z-twist into a twine of approximately 35,000 denier. The resulting twine was passed at 2.6 feet per minute through about 7 inches of immersion in a solution comprising 5 parts of vinyl chloride-vinyl acetate polymer in which vinyl chloride predominates to the extent of 88 to 90 percent, and 95 parts methyl ethyl ketone. Loosely held solution was allowed to drain from the twine by gravity as it passed upwardly to a heater. The twine passed through the heater maintained at 110° C. for about ¾ of a minute. A coil of twine prepared in this manner was then placed in an oven maintained at 100° C. for 15 minutes. Thereafter the twine was weighed and found to have gained 6 percent in denier over that just before dipping. The knot strength measured 130 pounds which is 35 percent greater than the knot strength of the twisted but untreated twine.

Example 2

Twenty-one ends of rayon tire yarn amounting to about 34,000 denier were plied at 1.1 twists per inch into a twine which was passed at 2.6 feet per minute through 7 inches of immersion within a solution comprising 4 parts of polystyrene having a molecular weight of about 30,000, and 96 parts of a solvent mixture consisting of acetone and benzene mixed part for part. The twine wet with solution was drawn upwardly through a drying tower maintained at 180° C. and collected. The coated twine was found to have gained approximately 5 percent in denier and sustained an increase in knot strength of 28 percent when compared with a sample of uncoated twine.

Example 3

A twine of superior knot strength was prepared with a polystyrene finish by the procedure described in Example 2, except that the styrene was dissolved in aromatic naphtha (Solvesso 100).

Example 4

A twisted rayon twine constructed as described in Examples 1 and 2 was passed through a bath (7 inches of immersion) comprising 3 percent of polyvinyl alcohol in water, then through the drying tower maintained at 180° C., and then wound at 2.6 feet per minute. A coil of the twine thus collected was further dried for 15 minutes at 100° C. The twine taken from the coil was found to have 6 percent greater denier and 10 percent greater knot strength than a sample of plied twisted yarn lacking the resin application.

Example 5

A rayon twine is treated with polyvinyl alcohol in accordance with Example 4 except that a 5% solution of polyvinyl alcohol in formamide maintained at a temperature of above 80° C. is substituted for the aqueous solution of Example 4. The resinified twine has a denier value similar to that of the product of Example 4 but has slightly higher knot strength. Because of the solubility of polyvinyl alcohol in water, the twines produced in accordance with Examples 4 and 5 are preferred for use indoors.

Example 6

A rayon twine was prepared by plying 21 ends of 1680 denier tire yarn. The twine was twisted 1.1 turns per inch then led through a bath of 1 percent solution of polyvinyl butyral in ethanol. The twine was dried at 150° C. until almost dry. Drying was then completed at 100° C. for 15 minutes. The dried twine after treatment with the resin was found to have increased 3 percent in denier and 9 percent in knot strength.

Example 7

An approximately 30,000 denier twine was prepared by plying 18 ends of untwisted tire yarn at 1.1 twist per inch and drawing the twine at 2.6 feet per minute through a 6 percent solution of vinylidene chloride-vinyl chloride saran copolymer in methyl ethyl ketone. The twine was subjected to 13½ seconds immersion in the solution while traversing a 7 inch path therein, and thereafter dried. The resulting twine had approximately an 8 percent increase in denier and approximately 25 percent increase in knot strength.

*Example 8*

A twine was prepared as described in Example 7 except that a 4 percent solution of vinylidene chloride-acrylonitrile copolymer (Saran F-120) in methyl ethyl ketone is substituted for the solution vinylidene chloride-vinyl chloride copolymer. The application of the resin to the twine increases its denier approximately 6 percent and its knot strength substantially.

The above examples are illustrative of the various vinyl resins which may be applied admixed with, but preferably, in most instances, without plasticizers. The proportions of the resins to the solvents therefor as set forth herein are selected primarily for the purpose of controlling through viscosity, run off, etc., the amount of resin deposited in the twine. It is readily understood that for more economical use of solvents, diluents compatible with the resins may be mixed with solvents to provide solutions of desired concentrations. In commercial product installations, the drying operation would preferably include solvent recovery.

The invention may be practiced by passing the dry untreated cordage or twine through the resinous solution under such conditions of immersion that the strand is not completely uniformly impregnated throughout its cross section. The satisfactory strand, in accordance with this invention, is one in which the impregnation by the resin is substantially uniform with respect to the length of the strand and with respect to any circumference within or at the surface of the strand concentric to its linear axis. The latter term is deemed to be appropriate with respect to cordage since practically all twisted strands assume a shape having a circular cross section.

The present invention is concerned primarily with the production of rayon cordage which may be knotted by mechanical means to form bands of ties which will withstand tension under normal use without breaking or slipping of the knots, and to employ such cordage in uses wherein sisal cordage now serves. In accomplishing these objectives the requisite body, pliability, knot strength, and surface condition to render rayon filamentary strands suitable as a baling twine have been obtained by applying vinyl resins as hereinbefore described. In doing so, the filaments are effectively coated and/or impregnated without cementing them together to the extent that the twine behaves as a solid flexible member. The filaments are essentially independent and free of each other and thus the twine is pliable and forms compact knots in which the twine does not slip.

Various changes and modifications may be made in practicing the invention without departing from the spirit and scope thereof and, therefore, the invention is not to be limited except as defined in the appended claims.

I claim:

1. Cordage comprising regenerated cellulose filaments and from 3 to 20 percent based on the dry weight of the filaments of a vinyl resin uniformly distributed within the cordage with respect to its length and cross-section from the group consisting of vinyl chloride-vinyl acetate, vinyl chloride-vinylidene chloride, vinylidene chloride-acrylonitrile, polyvinyl butyral, polyvinyl alcohol and polystyrene, the resin in said cordage being a dried product of a solution consisting of the resin and an organic solvent therefor, the cordage having a twist therein of 0.8 to 1.5 turns per inch.

2. Cordage as defined in claim 1 wherein the denier of the regenerated cellulose component is 25,000 to 40,000.

3. Cordage as defined in claim 1 wherein the magnitude of twist is approximately 1.1 turns per inch.

4. Cordage comprising regenerated cellulose filaments and from 3 to 20 percent based on the weight of the filaments of a copolymer consisting predominantly of vinyl chloride and to a lesser extent of vinyl acetate uniformly distributed with said cordage with respect to its length and cross-section, the copolymer of said cordage being the dried product of a solution consisting of the resin and an organic solvent therefor, said cordage having a twist therein of 0.8 to 1.5 turns per inch.

5. Cordage comprising regenerated cellulose filaments and from 3 to 20 percent based on the dry weight of the filaments of polystyrene uniformly distributed within said cordage with respect to its length and cross-section, said polymer in the cordage being the dried product of the solution consisting of the resin and an organic solvent therefor, said cordage having a twist therein of 0.8 to 1.5 turns per inch.

6. Cordage comprising regenerated cellulose filaments and from 3 to 20 percent based on the dry weight of the filaments of a vinyl resin uniformly distributed within the cordage with respect to its length and cross-section from the group consisting of vinyl chloride-vinyl acetate, vinyl chloride-vinylidene chloride, vinylidene chloride-acrylonitrile, polyvinyl butyral, polyvinyl alcohol and polystyrene, the resin in said cordage being the dried product of a solution consisting of the resin and an organic solvent therefor which does not appreciably swell the regenerated cellulose of the filaments, said cordage having a twist therein of 0.8 to 1.5 turns per inch.

7. A method of making cordage comprising substantially permeating a strand of regenerated cellulose filaments with a volatile organic liquid consisting of an organic solvent of a vinyl resin from the group consisting of vinyl chloride-vinyl acetate, vinyl chloride-vinylidene chloride, vinylidene chloride-acrylonitrile, polyvinyl butyral, polyvinyl alcohol and polystyrene, said resin being dissolved in said liquid at a concentration of from 2 to 10 percent and said liquid being completely volatile except for the resin, removing the loosely held portions of said liquid from the strand, evaporating the volatile portion of the liquid from the strand, and twisting the strand at any stage of the method from prior to application of the liquid to the strand until after the evaporation of the said volatile portion to place twist therein of from 0.8 to 1.5 turns per inch.

8. A method of making cordage comprising twisting a strand of regenerated cellulose filaments from 0.8 to 1.5 turns per inch, permeating the strand with a volatile liquid consisting of an organic solvent and a vinyl resin from the group consisting of vinyl chloride-vinyl acetate, vinyl chloride-vinylidene chloride, vinylidene chloride-acrylonitrile, polyvinyl butyral, polyvinyl alcohol and polystyrene, said liquid containing from 2 to 10 percent of said resin and being completely volatile except for said resin, removing loosely held portions of said liquid from the strand and evaporating the volatile portion of the liquid from the strand while maintaining said twist.

9. A method of making cordage comprising twisting a strand of regenerated cellulose filaments measuring 25,000 to 40,000 denier to not more than 1½ turns per inch, then passing the strand into and out of a liquid consisting of an organic solvent and a vinyl resin dissolved therein to an extent of 2 to 10 percent concentration from the group consisting of vinyl chloride-vinyl acetate, vinyl chloride-vinylidene chloride, vinylidene chloride-acrylonitrile, polyvinyl butyral, polyvinyl alcohol and polystyrene, said solvent being of the type having negligible swelling effect on the regenerated cellulose of the filaments, the liquid being completely volatile except for the resin dissolved therein, removing loosely held liquid from the strand to an extent obtained by natural drainage, and evaporating the volatile portion of the liquid from the strand.

10. A method of making cordage comprising permeating a strand of regenerated cellulose filaments with a liquid consisting of an organic solvent and a vinyl resin dissolved therein from the group consisting of vinyl chloride-vinyl acetate, vinyl chloride-vinylidene chloride, vinylidene chloride-acrylonitrile, polyvinyl butyral, polyvinyl alcohol and polystyrene, said solvent being of the type having negligible swelling effect on the regenerated cellulose of the filaments, removing loosely held liquid from the strand to the extent that the resin of the liquid remaining in the strand weighs from 3 to 20 percent of the weight of the dry strand before application of the liquid, drying the strand, and twisting the strand at any stage of the method from prior to the application of said liquid to place twist therein of from 0.8 to 1.5 turns per inch.

References Cited in the file of this patent

UNITED STATES PATENTS

| | | |
|---|---|---|
| 1,974,453 | Gallandet | Sept. 25, 1934 |
| 2,208,632 | Dreyfus | July 23, 1940 |
| 2,517,646 | Ewing | Aug. 8, 1950 |
| 2,590,586 | Thompson et al. | Mar. 25, 1952 |
| 2,775,860 | Morrison | Jan. 1, 1957 |